United States Patent [19]

Kamemoto et al.

[11] Patent Number: 4,809,505
[45] Date of Patent: Mar. 7, 1989

[54] MASTER CYLINDER

[75] Inventors: Katsuaki Kamemoto; Ken Nakaharai, both of Yokosuka, Japan

[73] Assignee: Nippon Air Brake Co., Ltd., Japan

[21] Appl. No.: 75,136

[22] Filed: Jul. 20, 1987

[30] Foreign Application Priority Data

Sep. 24, 1986 [JP] Japan .............................. 61-146087[U]

[51] Int. Cl.⁴ .......................... F15B 7/00; F15B 11/00; B60T 11/00
[52] U.S. Cl. ........................................ 60/591; 91/532; 188/349; 303/9.63; 303/9.65
[58] Field of Search ..................... 60/562, 591; 91/367, 91/453, 532; 188/151 A, 345, 349; 303/9.62, 9.63, 9.65, 9.71, 84.2

[56] References Cited

U.S. PATENT DOCUMENTS

| | | | |
|---|---|---|---|
| 2,547,233 | 4/1951 | Seppmann | 60/591 X |
| 4,477,122 | 10/1984 | Hayashida | 60/591 X |
| 4,534,172 | 8/1985 | Price et al. | 60/562 X |
| 4,595,243 | 6/1986 | Gaiser | 60/591 X |
| 4,669,268 | 6/1987 | Takeuchi et al. | 60/591 |
| 4,709,968 | 12/1987 | Tanaka et al. | 60/591 X |

FOREIGN PATENT DOCUMENTS 157158 10/1985 European Pat. Off. .

Primary Examiner—Robert E. Garrett
Assistant Examiner—Mark A. Williamson
Attorney, Agent, or Firm—Kane, Dalsimer, Sullivan, Kurucz, Levy, Eisele & Richard

[57] ABSTRACT

A master cylinder includes a hydraulic pressure control valve having a valve member mounted in a valve body and normally held apart from a valve seat by a valve spring. The valve member is seated on the valve seat when a pressure in a pressure chamber of a housing of the master cylinder reaches a predetermined level. A control device includes a body received in the bore and having one end portion of a convex shape. The body of the control device is urged by a spring in such a manner that the one end portion projects through a port of the housing into the pressure chamber. The control device including a seat prevention mechanism operatively associating the body of the control device with the valve member so as to prevent the valve member from seating on the valve seat when upon movement of the cylinder piston beyond a predetermined stroke, the cylinder piston engages the one end portion and urges the body of the control device toward the valve member in a direction perpendicular to the axis of movement of the cylinder piston.

5 Claims, 3 Drawing Sheets

MASTER CYLINDER

BACKGROUND OF THE INVENTION

1. Field of the Invention

This invention relates generally to a master cylinder for a brake and particularly to a hydraulic pressure control valve which is connected to an outlet port of the master cylinder and releases its hydraulic pressure control operation when a secondary piston of the master cylinder is moved excessively beyond a predetermined stroke.

2. Prior Art

FIG. 1 shows one conventional hydraulic pressure control valve of this type as disclosed in European Patent Application No. 0157158. The hydraulic pressure control valve comprises a body 16 mounted at one end in a bore 14 of a housing of a tandem master cylinder, the bore 14 communicating with a pressure chamber 12 defined by the housing and a piston 10. The body 16 has a bore 18 of a stepped shape in communication with the bore 14, and an outlet 20 disposed at the other end of the body 16 and communicating with the bore 18. A piston 24 of a stepped shape is slidably received in the bore 18 so as to receive a pressure in the outlet 20, the piston 24 having a central passage 22 extending therethrough. A preload spring 26 is mounted in the bore 18 so as to urge the stepped piston 24 toward the outlet 20. A valve member 30 is provided so as to seat on a valve seat 24a formed on one end of the stepped piston 24 closer to the bore 14, the central passage 22 opening to this one end of the stepped piston 24 The valve member 30 is normally held in a predetermined position away from the valve seat 24a by means of a valve spring 28. With this hydraulic pressure control valve, the stepped piston 24 is held by the preload spring 26 in the position shown in FIG. 1 until the hydraulic pressure in the pressure chamber 12 reaches a predetermined level, so that the valve member 30 is held away from the valve seat 24a. When the hydraulic pressure in the pressure chamber 12 exceeds the predetermined level, the stepped piston 24 is moved upwardly (FIG. 1) against the bias of the preload spring 26, due to the hydraulic pressure differential between the greater diameter portion 24b and smaller diameter portion 24c of the stepped piston 24. As a result, the valve seat 24a is brought into seating engagement with a lower portion 30a of the valve member 30. Therefore, the rate of increase of the hydraulic pressure leading to the outlet 20 and acting on a brake for rear wheels of the vehicle becomes smaller than that of the hydraulic pressure (which is the same as the hydraulic pressure for a brake for the front wheels) in the pressure chamber 12.

However, if such a pressure control is carried out even when a brake circuit for the front wheels is subjected to malfunction, braking forces are insufficient to brake the vehicle. For this reason, with the hydraulic pressure control valve shown in FIG. 1, when the piston 10 is moved excessively beyond a predetermined stroke, a flange 10a of the piston 10 is brought into engagement with an upper portion 30b of the valve member 30 to move the valve member 30 in a direction perpendicular to the axis of the valve member 30 so as to pivot the valve member about its lower end 30c, thereby preventing the valve member 30 from seating on the valve seat 24a.

With the conventional hydraulic pressure control valve of FIG. 1, however, in the event of the replacement of component parts or the like, the piston 10 can not be removed from the housing of the master cylinder without removal of the hydraulic pressure control valve from the master cylinder housing since the valve member 30 extends into the pressure chamber 12.

SUMMARY OF THE INVENTION

It is therefore an object of this invention to provide a master cylinder in which the piston of the master cylinder can be removed from the master cylinder housing without removal of the hydraulic pressure control valve from the housing.

According to the present invention, there is provided a master cylinder comprising:

(a) a housing having a pressure chamber;

(b) a cylinder piston received in said housing and being normally movable over a predetermined stroke along an axis; and (c) a hydraulic pressure control valve comprising (i) a hollow body attached to said housing and having a bore at one end and an outlet at the other end, said housing having a port communicating said pressure chamber with said bore, (ii) a valve piston received in said body for movement, said piston having a passage, said pressure chamber being in communication with said outlet via said bore and said passage, said valve piston having a valve seat at one end disposed adjacent to said bore, said passage opening to said valve seat, (iii) a valve member mounted in said bore and normally held apart from said valve seat by a valve spring, said valve member being seated on said valve seat when the pressure in the pressure chamber reaches a predetermined level, and (iv) a control means comprising a body received in said bore and having one end portion of a convex shape, said body of said control means being urged by a spring in such a manner that said one end portion projects through said port into said pressure chamber, said control means including seat prevention means operatively associating said body of said control means with said valve member so as to prevent said valve member from seating on said valve seat when upon movement of said cylinder piston beyond said predetermined stroke, said cylinder piston engages said one end portion and urges said body of said control means toward said valve member in a direction perpendicular to the axis of movement of said cylinder piston.

DESCRIPTION OF THE PREFERRED EMBODIMENTS OF THE INVENTION

Figure 1:
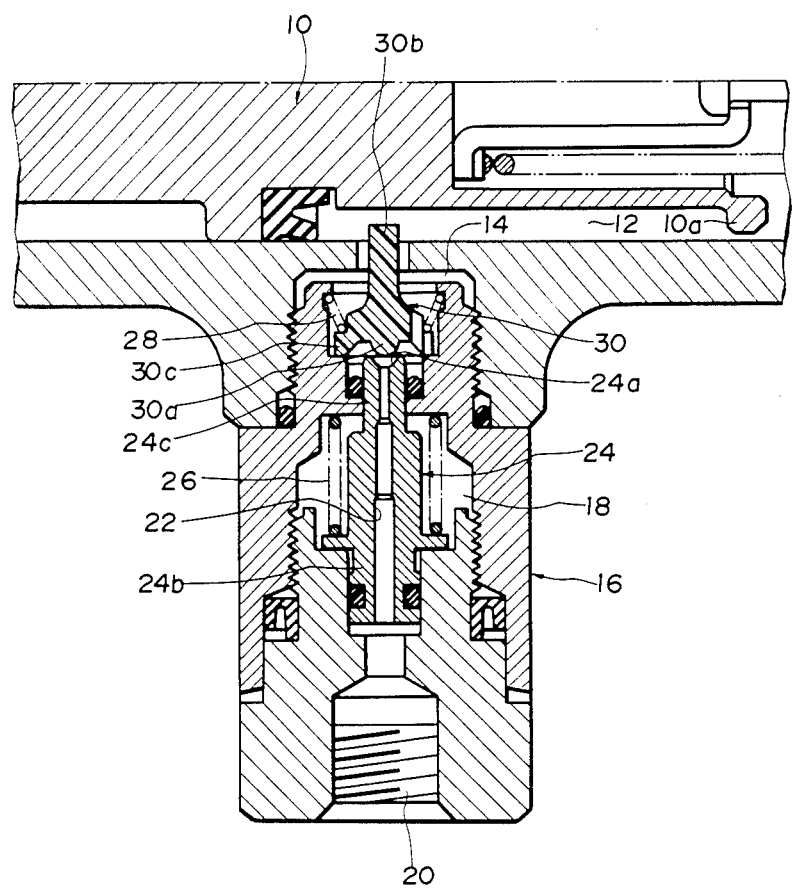
FIG. 1 is a cross-sectional view of a portion of a master cylinder provided in accordance with the prior art.

The invention will now be described with reference to the drawings in which like reference numerals denote corresponding parts in several views.

Figure 2:
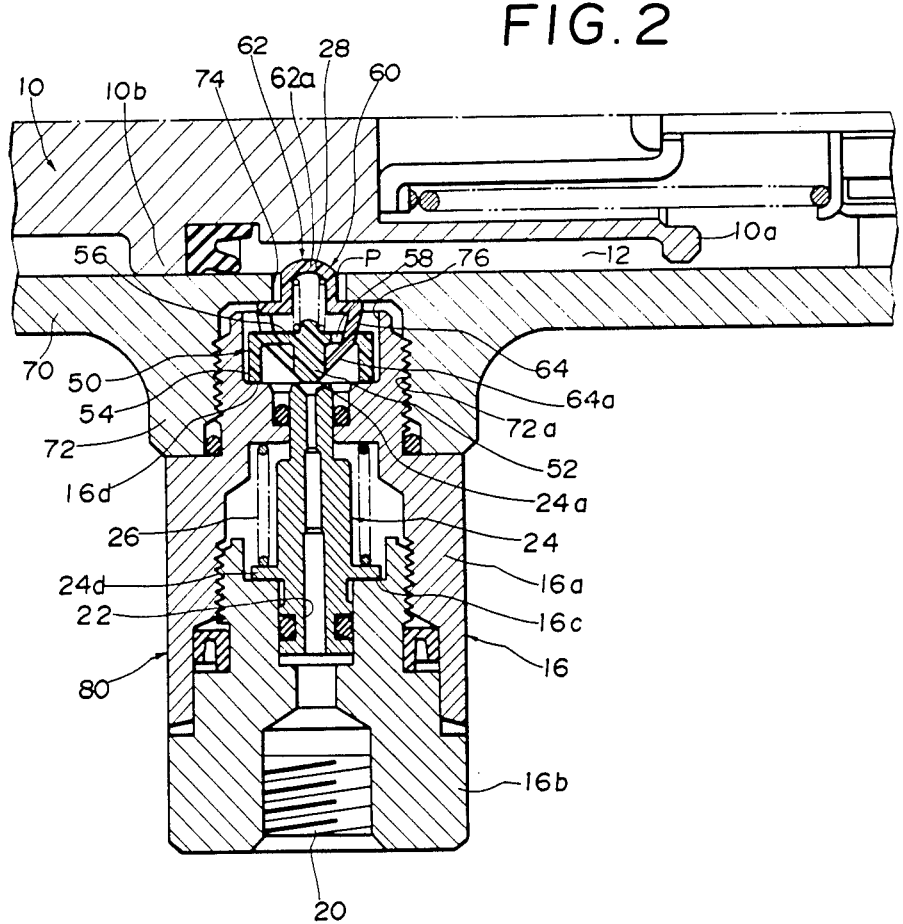
FIG. 2 is a cross-sectional view of a portion of a master cylinder provided in accordance with the present invention.

A tandem master cylinder shown in FIG. 2 comprises a housing or body 70 having an annular hollow boss 72.

The boss 72 has internal threads 72a formed in an inner surface thereof. The housing 70 has a port 74 communicating the interior of the housing 70 with the interior of the boss 72. The boss serves as a mounting portion for supporting a hydraulic pressure control valve 80.

A body 16 of the hydraulic pressure control valve 80 comprises a pair of first and second members 16a and 16b threadedly connected together. The first member 16a is threaded into the boss 72 at one end thereof, and the second member 16b has an outlet 20 at one end thereof. A piston 24 of a stepped shape is received in the body 16, and a preload spring 26 acts on the piston 24 to hold an intermediate flange 24d of the piston 24 against a shoulder 16c of the second body member 16b. Thus, the piston 24 is normally held stationary. In this condition, a valve seat 24a, formed on one end of the piston 24 to which a central axial passage 22 opens, is disposed immediately adjacent to a bore 76 formed in an upper end of the first member 16a. A valve member 50 of the poppet type is received in the bore 76. The valve member 50 has a bullet-shaped body 52, a cylindrical or tubular portion 54 surrounding the body 52 in coaxial relation thereto, and a connective wall 56 interconnecting the body 52 and the cylindrical portion 54. A plurality of, for example, three apertures 58 is formed through the connective wall 56 and are circumferentially spaced from one another. The valve 50 is urged by a valve spring 28 in such a manner that the lower end of the cylindrical wall 54 is held against a shoulder 16d, i.e., the bottom of the bore 76. In this condition, the lower end of the valve body 52 is spaced slightly from the valve seat 24a. Therefore, in the illustrated condition of the hydraulic pressure control valve 80, a pressure chamber 12, defined by the housing 70 of the master cylinder and a piston 10, is in communication with the outlet 20 via a port 74 formed in the housing 70, the apertures 58 and the central passage 22 of the piston 24. The piston 10 is received in the housing 70 for sliding movement along an axis of the piston 10.

A control member 60 includes a body 62 defined by a hollow cylindrical head portion 62a and a flat peripheral flange formed around the lower end of the head portion 62a, and three pawls 64 extending downwardly away from the head portion 62a. The pawls 64 extends through the apertures 58 of the valve member 50, respectively, and are directed toward the lower end of the valve body 52, so that the lower ends 64a of the pawls 64 are disposed adjacent to the lower end of the valve body 52. In the case where the control member 60 is molded from a plastics material, it is preferred that the pawls 64 should be resiliently engaged slightly with the peripheral surface of the valve body 52. The valve spring 28 is received in the hollow head portion 62a of the control member 60, so that the flange of the control member 60 is urged by the valve spring 28 against the surface of the housing 70 disposed around the edge of the port 74. In this condition, the head portion 62a of the control member 60 extends through the port 74 in spaced relation thereto, and an upper end of the head portion 62a projects slightly into the pressure chamber 12. The upper end of the head portion 62a is convex and more specifically semi-spherical or rounded, and the intersection P between the rounded end surface of this upper end and the peripheral surface of the head portion 62a is disposed either in a plane in which the upper edge of the port 74 lies (that is, in a plane of the inner surface of the wall of the housing 70 through which the port 74 is formed) or disposed slightly below this inner surface of the housing wall. With this arrangement, flanges 10a and 10b formed on the piston 10 can smoothly engage with the rounded upper end of the head portion 62a.

When a brake circuit for front wheels is subjected to malfunction, the piston 10 is axially moved excessively beyond a predetermined stroke, so that the flange 10a of the piston 10 is brought into engagement with the rounded head portion 62a to urge the control member 60 downwardly toward the valve member 50 against the bias of the valve spring 28, so that the control member 60 is moved along the axis of the valve member 50, that is, in a direction perpendicular to the axis of movement of the cylinder piston 10. It will be appreciated that the amount of movement of the control member 60 is determined by the amount of projection of the head portion 62a into the pressure chamber 12. Upon downward movement of the control member 60 along the axis of the valve member 50, the lower ends 64a of the pawls 64 of the control member 60 are moved to be interposed between the valve body 52 and the valve seat 24a of the piston 24 so as to prevent 60 the valve member 50 from seating on the valve seat 24a, thereby maintaining the communication between the pressure chamber 12 and the outlet 20.

When the piston 10 is removed from the housing 70 of the master cylinder, this can be easily effected without removal of the hydraulic pressure control valve 80 from the housing 70 since the control member 60 is smoothly retracted toward the valve member 50 upon engagement with the piston 10. In addition, when assembling the hydraulic pressure control valve 80, since the control member 60 has the pawls 64, the control member 60, the valve spring 28 and the valve member 50 can be assembled much like a unit, so that the assembly of the hydraulic pressure control valve 80 can be carried out easily.

Figure 3:
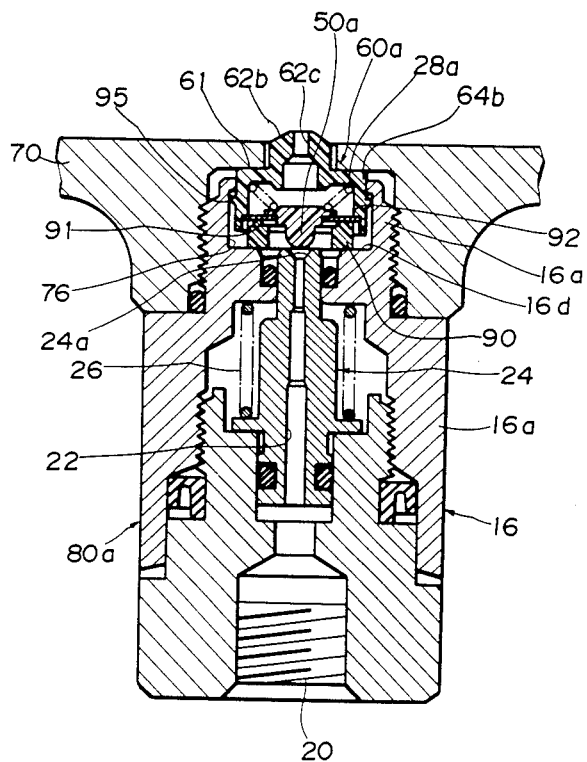
FIG. 3 is a cross-sectional view of a modified hydraulic pressure control valve.
Figure 4:
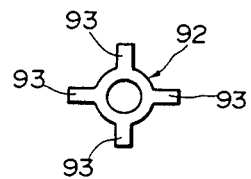
FIG. 4 is a plan view of a support ring.

FIG. 3 shows a modified hydraulic pressure control valve 80a. A control member 60a has a hollow cylindrical head portion 62b, a hollow cylindrical portion 64b of a greater diameter and an annular flat connective portion 61 interconnecting the head portion 62b and the cylindrical portion 64b. The head portion 62b has a port 62c formed through its upper end, and is tapered or rounded. An annular base member 90 is received in the bore 76 of the first member 16a and rests on the shoulder 16d. An upper end of the annular base member 90 is formed into an annular ridge 91. A deformable support ring 92 is mounted around a valve member 50a and has four radially outwardly-extending arms 93 of a resilient nature, as best shown in FIG. 4. The resilient arms 93 rest on the ridge 91 of the base member 90 at one side thereof. The cylindrical portion 64b is disposed around the annular ridge 91. The lower end of the cylindrical portion 64b of the control member 60a engages the outer ends of the four resilient arms 93 of the support ring 92 at the other sides of the arms 93. A valve spring 28a acts between the control member 60a and the valve member 50a. When the flange 10a of the piston 10 engages the head portion 62b to urge the control member 60a downwardly toward the valve member 50b, the four arms 93 of the support ring 92 are deformed or pivotally moved by the cylindrical portion 64b about the annular ridge 91 of the annular base member 90, so that the support ring 92 is moved upwardly together with the valve member 50a, thereby preventing the valve member 50a from seating on the valve seat 24a. A peripheral wedge-shaped projection 95 is formed around the outer surface of the cylindrical portion 64b of the control member 60a. The projection 95 is engaged with an inwardly-directed upper end of the first member 16a when the control member 60a is mounted on the first member 16a, thereby preventing the control member 60a from disengaging from the first member 16a when attaching the hydraulic pressure control valve 80a to the housing 70 of the master cylinder. The stroke of the valve member 50a can be suitably determined by changing the diameter of the annular ridge 91.

Figure 5:
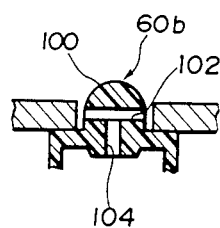
FIG. 5 is a cross-sectional view of a portion of a modified control member.

FIG. 5 shows a modified control member 60b which has a head portion 100 loosely received in the port 74, the head portion 100 having a transverse passage 102 extending therethrough and an axial passage 104 leading from the transverse passage 102 to the lower surface of the head portion 100.

What is claimed is:

1.. A master cylinder comprising:
(a) a housing having a pressure chamber;
(b) a cylinder piston received in said housing thereby defining said pressure chamber and being normally movable over a predetermined stroke along an axis;
(c) a hydraulic pressure control valve comprising (i) a hollow body attached to said housing and having a bore at one end and an outlet at the other end, said housing having a port communicating said pressure chamber with said bore, (ii) a valve piston received in said body for movement, said piston having a passage, said pressure chamber being in communication with said outlet via said bore and said passage, said valve piston having a valve seat at one end disposed adjacent to said bore, said passage opening to said valve seat, (iii) a valve member mounted in said bore and normally held apart from said valve spring, said valve member being seated on said valve seat when the pressure in the pressure chamber reaches a predetermined level, and (iv) a control means comprising a body received in said bore and having one end portion of a convex shape, said body of said control means being urged by a spring in such a manner that one end portion projects through said port into said pressure chamber, said control means including seat prevention means operatively associating said body of said control means with said valve member so as to prevent said valve member from seating on said valve seat and a flange which engages said housing and restricts projection of said one end portion into said pressure chamber, wherein said one end portion is away from said piston during normal operation, when upon movement of said cylinder piston beyond said predetermined stroke, said cylinder piston engages said one end portion and urges said body of said control means toward said valve member in a direction perpendicular to the axis of movement of said cylinder piston.

2. A master cylinder according to claim 1, in which said one end portion is rounded.

3. A master cylinder comprising:
(a) a housing having a pressure chamber;
(b) a cylinder piston received in said housing and being normally movable over a predetermined stroke along an axis;
(c) a hydraulic pressure control valve comprising (i) a hollow body attached to said housing and having a bore at one end and an outlet at the other end, said housing having a port communicating said pressure chamber with said bore, (ii) a valve piston received in said body for movement, said piston having a passage, said pressure chamber being in communication with said outlet via said bore and said passage, said valve piston having a valve seat at one end disposed adjacent to said bore, said passage opening to said valve seat, (iii) a valve member mounted in said bore and normally held apart from said valve seat by a valve spring, said valve member being seated on said valve seat when the pressure in the pressure chamber reaches a predetermined level, and (iv) a control means comprising a body received in said bore and having one portion of a convex shape, said body of said control means being urged by a spring in such a manner that said one end portion projects through said port into said pressure chamber, said control means including seat prevention means operatively associating said body of said control means with said valve member from seating on said valve seat when upon movement of said cylinder piston beyond said predetermined stroke, said cylinder piston engages said one end portion and urges said body of said control means toward said valve member in a direction perpendicular to the axis of movement of said cylinder piston, wherein said seat prevention means comprises pawls fixed to said body of said control means, said pawls intruding between said valve member and said valve seat when said body of said control means is urged by said cylinder piston toward said valve member.

4. A master cylinder according to claim 3, in which said seat prevention means comprises a resilient member supporting said valve member and engaged with said body of said control means, said resilient member being resiliently deformed to move said valve member in a direction away from said valve seat when said body of said control means is urged by said cylinder piston toward said valve member.

5. A master cylinder according to claim 4, in which said resilient member comprises a support ring secured to said body of said control means and having a plurality of resilient arms, an annular base member being disposed in said bore and having an annular ridge with which said resilient arms are engaged at one sides thereof, said body of said control means having a cylindrical portion disposed around said annular ridge and engaging said resilient arms at the other sides thereof, whereby when said body of said control means is urged by said cylinder piston toward said valve member, said resilient arms are pivotally moved by said cylindrical portion about said annular ridge, so that said support ring is moved together with the valve member in a direction away from said valve seat.

* * * * *